March 24, 1970

R. T. COWAN 3,502,171

COMPOSITE LAMINAR STRUCTURE FOR NOISE ATTENUATION OF
FAST MOVING GAS STREAMS, AND METHOD
OF MAKING THE SAME

Filed May 31, 1968

INVENTOR
ROBERT T. COWAN

BY
Christensen, Sanborn
and Matthews
ATTORNEYS

United States Patent Office 3,502,171
Patented Mar. 24, 1970

3,502,171
COMPOSITE LAMINAR STRUCTURE FOR NOISE ATTENUATION OF FAST MOVING GAS STREAMS, AND METHOD OF MAKING THE SAME
Robert T. Cowan, Bellevue, Wash., assignor to The Boeing Company, Seattle, Wash., a corporation of Delaware
Filed May 31, 1968, Ser. No. 733,666
Int. Cl. F01n *1/24;* G10k *11/04*
U.S. Cl. 181—33                                                                 12 Claims

ABSTRACT OF THE DISCLOSURE

A composite laminar structure is disclosed which is especialy adapted for use with fast moving gas streams, as a means of attenuating the noise generated thereby. Moreover, a method is disclosed whereby the structure can be fabricated to maintain a constant noise attenuation efficiency as the gas stream changes from one speed to another. The composite structure comprises a mat of sound-absorbing material having opposing faces thereon of which one is perforated to admit sound waves to the mat and the other is closed to prevent the waves from escaping from the mat. The perforated face has a porous skin thereover which is bonded to the mat and comprised of at least two superposed and laminated woven cloth plies each having serially spaced rows of warp threads and serially spaced rows of weft or fill threads intersecting therein so that a multitude of interstices are formed within each ply. The threads of each ply are covered by a cured thermoset resin which bridges the intersections thereof so as to form a continuous matrix having substantial portions of the interstices remaining open therewithin. Moreover, corresponding threads of the two plies define an angle of less than 90° with respect to one another so that the open portions of mutually adjacent interstices in the plies are out of registry with one another to a preset degree dependent on the porosity desired. The degree of relative angular orientation can be adjusted in fabricating the skin to vary the porosity and therefore the Rayl of the skin depending on the expected speed of the gas stream and thus the expected frequency of the sound waves emanating therefrom.

FIELD OF THE INVENTION

This invention relates to noise attenuation structures and to methods for making the same. In particular it relates to composite laminar structures which are adapted for use with fast moving gas streams, as a means of attenuating the noise generated thereby; and, moreover, to methods whereby structures of this type can be fabricated to maintain a constant noise attenuation efficiency as the gas stream changes from one speed to another.

In describing the invention, the term "Rayl" will be employed in reference to the acoustical gas flow resistance of a porous medium. A Rayl is defined as the ratio of the pressure drop across the porous medium, $\Delta P$, to the gas flow velocity, $u$, through the medium, or $$R \text{ (c.g.s. Rayls)} = \frac{\Delta P}{u} \text{ in } \frac{\text{dynes/cm.}^2}{\text{cm./sec.}}$$

The Rayl of a porous medium is therefore a correlative of its porosity.

BACKGROUND OF THE INVENTION INCLUDING CERTAIN OBJECTS THEREOF

Certain composite laminar structures have been used heretofore as liners for ducts to attenuate the noise generated by a high speed air or other gas stream moving therethrough. These structures are a laminar composite of a sound-absorbing mat and a porous metal skin. One of the opposing faces of the mat is perforated to admit sound waves to the mat and the other is closed to prevent the waves from escaping from the mat. The porous metal skin is applied over the perforated face of the mat and bonded to it so as to lend strength and rigidity to the mat and to present a smooth relatively continuous surface to the airstream. Typically, the metallic substance of the skin consists of a single monolithic layer of felt metal, or a layer of woven wire screen or hardware cloth, as is used in the Walton et al. 2,749,998 U.S. patent.

Although felt metal, wire screen, hardware cloth and the like constitute an effective material with which to reinforce the mat and to give it a smooth surface, they are nevertheless costly, and in addition to adding considerable weight to the composite structure, they also severely reduce its noise attenuation efficiency. This last disadvantage results from several drawbacks which are inherent in use of porous metallic materials. For one, it is often impossible to control the porosity of the material other than by increasing the amount, and therefore the weight of the metallic material which is used. For example, when metal wool is converted into felt metal, a specified Rayl can be satisfied only by varying the depth or thickness of the wool sheet, and even then the felt metal product may have a wide range of deviation from the prescribed Rayl, such as a deviation of ±50% or more. Another drawback lies in the fact that the metallic materials are readily "wet" by the adhesives commonly used in bonding the skin to the mat. Therefore, much of the available sound absorption area of the mat may be lost in the bonding process. For example, consider a honeycomb core having an optimal sound-absorbing cell which is ⅜–½ inch in diameter and ¼–1 inch in depth. When a felt metal skin is bonded to one face of such a core, using any of the common adhesives for this purpose, it has been found that up to 40% of the available sound absorption area of the core is lost in the fact that the adhesive tends to flow or "wick up" through the skin to the outer face thereof, where it makes contact with the skin at the end edges of the cells. Moreover, the loss of this adhesive from the interface between the skin and the edges of the cells, tends to weaken the bond between the mat and the skin, and thus the structural strength of the composite. Additional adhesive may be used to offset this tendency, but this in turn only increase the loss of absorption area as the additional adhesive spreads even further into the body of the felt metal. By going to a larger cell size, such as a 2½ inch hexagonal cell, it is possible to gain a larger area of absorption, but this gain is offset in a loss of structural strength. In fact, in some instances where such a cell size was used, harmonics generated by high frequency noises actually became destructive to the composite as a result of the vibration that followed.

One object of the present invention is to provide a composite laminar structure of this same type, that is, one which comprises a sound-absorbing mat with a porous skin thereover, so that the composite is adapted for use with fast moving air or other gas streams to attenuate the noise generated thereby, but in which, however, the sound absorption capacity of the mat is preserved over substantially the entire area of the skin. Another object is to provide a method whereby the laminar structure of the composite can be changed to maintain a constant noise attenuation efficiency as the gas stream changes from one speed to another. A still further object is to provide a method of this nature whereby the laminar structure of the composite can be changed to maintain a constant noise attenuation efficiency without substantially increasing the weight of the composite. Still another object is to provide a composite laminar structure of this nature which can be employed as either a load-bearing structural panel, or as a nonload-bearing acoustical liner. Other objects include the provision of a structure and technique in the foregoing manner wherein the panel is readily reproducible by simple inexpensive manufacturing techniques, such as the vacuum bag process; and wherein the panel is relatively light in weight, such as half the weight of a similarly dimensioned felt metal composite, and is also cheap to produce, such as for as little as $1.00 per sq. ft. in material, as compared to $40.00 to $50.00 per sq. ft. for the felt metal composite. Still further objects will become apparent from the description of the invention which follows hereafter.

SUMMARY OF THE INVENTION

These objects and advantages are realized by a composite laminar structure of my invention, and a technique for making the same, wherein the laminar structure comprises a mat of sound-absorbing material having opposing faces thereon of which one is perforated to admit sound waves to the mat and the other is closed to prevent the waves from escaping from the mat. The perforated face has a porous skin thereover which is bonded to the mat and comprises at least two superposed and laminated woven cloth plies each having serially spaced rows of warp threads and serially spaced rows of weft or fill threads intersecting therein so that a multitude of interstices are formed within each ply. The threads of each ply are covered by a cured thermoset resin which bridges the intersections thereof so as to form a continuous matrix having substantial portions of the interstices remaining open therewithin. Moreover, corresponding threads of the two plies define an angle of less than 90° with respect to one another so that the open portions of mutually adjacent interstices in the plies are out of registry with one another to a preset degree dependent on the porosity desired. The composite structure is manufactured by the steps of placing a laminar assembly of two or more plies of the above-described resin impregnated but unsaturated woven cloth material in a vacuum bag or other laminate press, adjusting the relative orientation of the plies in accordance with the desired porosity for the skin, laminating the plies with one another to form the skin, while maintaining the open portions of the interstices therein, and then bonding the skin to the perforated face of a mat of sound-absorbing material to form the composite. The resin impregnated plies may be in a B-stage condition when assembled, and then laminated to one another in the press by fusing them together under the application of limited heat and pressure. Preferably, a post-cure is also employed to thoroughly set the resin before the skin is bonded to the mat. The latter operation may be accomplished by brushing or rolling an adhesive on the perforated face of the mat, and/or the skin, and then laminating one to the other in the press.

The woven cloth plies may have a common thread denier and/or thread count per unit dimension; or, in the alternative, they may have a different denier and/or count so as to vary the cross-sectional area of the open portions of the interstices from one ply to the next. I find that by varying the thread size and/or the thread count, in addition to the angular orientation between the plies, I can exercise a close degree of control over the porosity of the skin, and can maintain a constant noise attenuation efficiency without a substantial increase in weight and/or a substantial loss in strength from one airspeed to another. I also find that the porosity of the skin can be varied by adjusting the resin count in the laminar assembly when the plies are laminated to one another. For example, varying the number and/or thickness of the bleeder layers in the vacuum bag will adjust the final resin count. Of course, the percentage of resin and the percentage of volatiles in the orignal plies, as well as the gel time and the percent flow of the resin, also affect the ultimate resin content in known manner. Therefore, most of my composite structures are obtained initially in an empirical manner, although by correlating the results it is possible to reproduce each composite within a close increment of acoustical quality control such as ±10%. The usual range of variance in the acoustical flow resistance of the skin is about 3–100 Rayls, using a range of about 10–45° in the relative angular orientation of the plies.

Preferably, the plies have a square weave and may be woven from one or more of a number of substances including synthetic and vegetable fibers such as glass, nylon, rayon, cellulose, and the like, or burlap produced, for example, from jute, flax, hemp or manila fibers. Experience to date has indicated that glass cloth produces the best structural results. Glass also has the advantage of being able to withstand high temperatures, such as temperatures in the range of 600° F.

The preferred resin system is a high temperature polyimide system capable of withstanding such temperatures. However, other systems, including other high temperature systems, may be employed. For example, the woven cloth plies may be impregnated with an epoxy, phenolic, diphenyl oxide, or polyphenylene resin system, or with a system derived from polymers such as perfluoroalkyltriazine, polytetrafluoroethylene, silicone, fluorocarbon terpolymer, fluorocarbon copolymer, polyfuran, polyisobutylene and isoprene/isobutylene copolymer.

The sound-absorbing mat is preferably also fabricated from two or more laminated plies of a resin impregnated woven cloth material such as glass. In preferred form, the mat has a honeycomb structure, to one face of which a solid or closed backing has been applied to trap the incoming sound waves therein. The backing is also preferably fabricated from two or more laminated plies of a resin impregnated woven cloth material such as glass. Of course, to present a closed surface to the waves, the plies are laminated at a resin content and/or resin viscosity which operates to close the interstices between threads. Normally, the plies are also tightly woven and arranged so that the warp threads in each ply are parallel to the warp length of the laminate for strength. As indicated earlier, the optimum cell size is a ⅜–½ inch hexagonal cell having a ¼–1 inch depth.

The adhesive by which the mat and skin are bonded together is preferably a matching high temperature resin adhesive, such as a high temperature polyimide structural adhesive which is readily compatible with the preferred polyimide woven glass cloth impregnates. Tape adhesives and structural foam adhesives may also be employed.

DESCRIPTION OF A PREFERRED EMBODIMENT THEREOF

These and other features of the invention will be better understood by reference to the accompanying drawing wherein I have illustrated one embodiment of my invention, together with an illustration of a typical prior art metal skin product for comparison.

In the drawing, FIGURE 1 is a schematic plan view of a three ply porous skin for use in the embodiment, showing each of the plies in turn;

Figure 1:
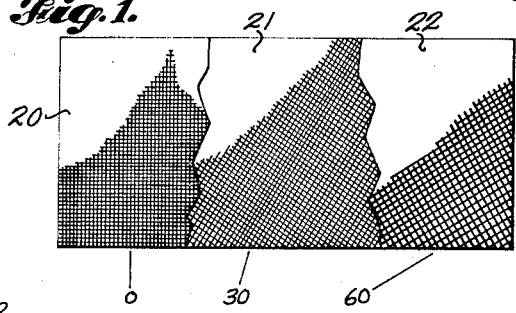
Figure 2:
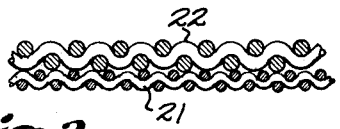
FIGURE 2 is a part cross-sectional view of the two uppermost plies, to show a difference in thread denier and thread count.
Figure 3:
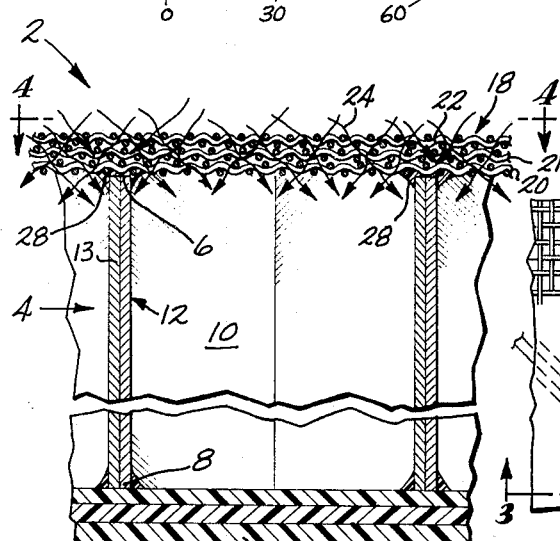
FIGURE 3 is a part cross-sectional view of the embodiment taken along the line 3—3 in FIGURE 4.
Figure 4:
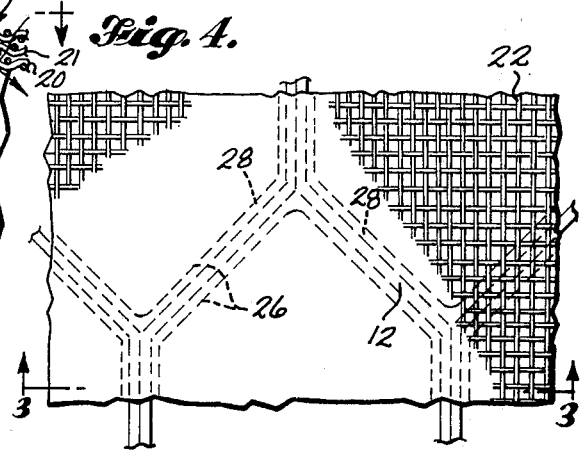
FIGURE 4 is a part plan view of the embodiment in FIGURE 3 as seen along the line 4—4 thereof.

Referring firstly to FIGURES 1–4, it will be seen that the acoustical panel 2 in FIGURES 3 and 4 is comprised of a honeycomb core 4 having upper and lower faces defined by the end edges 6 and 8, respectively, of the openended cells 10 therein. The walls 12 of the core are fabricated from two plies 13 of polyimide resin impregnated woven glass cloth material laminated to one another and post-cured as explained hereinbefore. The core 4 is converted into a sound-absorbing mat by adhesively bonding a solid or closed skin 14 to the lower face thereof, in order to trap sound waves entering the core through the open ends of the cells at the upper face 6 of the core. The closed skin 14 is comprised of three superposed and laminated polyimide resin impregnated woven glass cloth plies 16 which were laminated with a resin content and viscosity adapted to close the interstices between the threads of the respective plies.

The upper perforated face 6 of the core is covered by a porous skin 18 comprised of three superposed and laminated polyimide resin impregnated woven glass cloth plies 20, 21 and 22 which were prepared, arranged, and laminated to provide a porous medium of predetermined Rayl, as explained hereinbefore. Each ply has a different thread denier and thread count, and the content and viscosity of the resin impregnate in each ply was adjusted so that only the threads were saturated during the impregnation procedure, and only the intersections between threads were bridged, thereby forming a continuous matrix having substantial portions of the interstices among the threads remaining open therewithin. As seen in FIGURES 1 and 2 the variance in thread size and count operates to vary the cross-sectional area of the open portions of the interstices from one ply to the next; and, moreover, in accord with the invention, the three plies are oriented at different angles with respect to one another so that the open portions of mutually adjacent interstices in the plies are out of registry with one another to the designated degree. Thus, the innermost ply 20, relative to the core, has a zero orientation with respect to the warp length of the skin, and each of the remaining plies 21 and 22 has a relative angular orientation of 30° to 60°, respectively, in the outward direction from the core. These orientations provide the greatest degree of porosity control where three plies are employed.

The sound waves 24 generated by an airstream moving over the panel impinge on the porous skin 18 over the entire outer face thereof and are admitted to the honeycomb core 4 through the interstitial passages formed in the skin 18. However, the extent to which the impinging waves are admitted to the core 4 is a function of the porosity of the skin 18 and the percentage magnitude of the absorption area of the core which is exposed to the waves. The maximum absorption can occur only if the porosity of the skin 18 is suited to the frequency of the waves, and the full length and breadth of the core 4 is exposed to the waves by the skin.

According to the invention, the Rayl of the skin 18 is programmed to satisfy the frequency of the incoming waves, by adjusting the relative angular orientation among the plies 20–22. Moreover, it has been found that other unique characteristics of the panel operate to expose substantially the entire perforated face 6 of the core to the impinging sound waves, as illustrated in FIGURE 3. Each of the skins 14 and 18 is bonded to the core by a polyimide structural adhesive as explained hereinbefore. The adhesive is applied in a liquid phase and it has been observed that it has little or no tendency to flow and to wet the body of the porous skin 18 beyond the line of contact 26 between the skin and the end edges of the cells. Thus, only a filet bead 28 of the adhesive is formed along the edges 6 of the cells and this bead in turn provides a strong bond between the core and the skin. Little of the open end area of a cell is consumed by the contact line 26 of the adhesive, and since the interstitial passages of the skin 18 are as often as not angled at less than 90° to the outer face of the skin, the impinging waves can enter the mat at any point across the face of the skin, including at points directly opposite to the end edges 6 of the cells.

Figure 5:
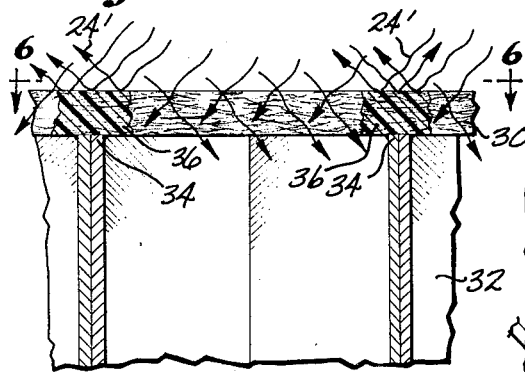
FIGURE 5 is a part cross-sectional view of the prior art construction as seen along the line 5—5 of FIGURE 6.
Figure 6:
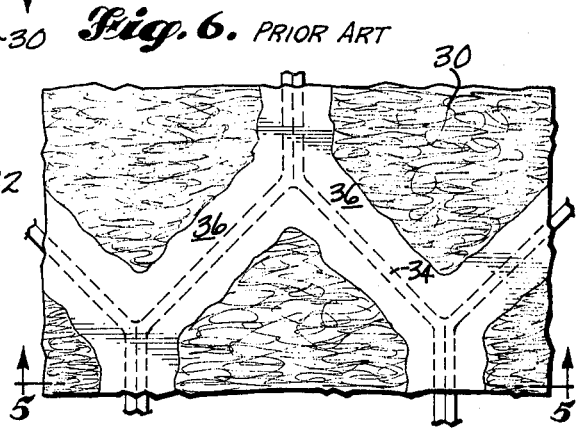
FIGURE 6 is a plan view of the prior art construction in FIGURE 5 as seen along the line 6—6 thereof.

In FIGURES 5 and 6 a felt metal skin 30 has been applied to a polyimide resin impregnated woven glass cloth honeycomb mat 32. The same resin adhesive, a polyimide structural adhesive, was used in bonding the felt metal skin to the mat. Due to the tendency of the adhesive to wet the felt metal, much of it "wicks up" into the skin 30 where the skin contacts the end edges 34 of the cells. Considering the small skin thicknesses normally employed in acoustic panels of this construction, the adhesive is commonly soaked up by the metal to the extent that the opposing regions 36 of the skin are filled with the adhesive, as illustrated in FIGURE 5. This has a twofold effect. Firstly, the loss in adhesive leaves a weak bond at the interface between the felt metal skin and the end edges of the cells; note the absence of a strong filet bead as was developed in the embodiment of FIGURES 1–4. And, secondly, the buildup of adhesive in the body of the felt metal has the effect of denying entry to those sound waves which impinge on the regions 36 of the skin occupied by the adhesive. Note the deflected waves 24' in FIGURE 5. As indicated earlier, the adhesive contact line 36 may block as much as 40% of the absorption area of the mat, and coupled with the wide increment of acoustical quality control in the felt metal itself, it has been found that the noise attenuation efficiency of a felt metal composite is impractically low for most applications.

While the invention has been described with reference to a particular embodiment thereof, it will be understood that many changes and additions can be made in and to the invention without departing from the scope and spirit of the same as defined in the claims following.

I claim as my invention:

1. A composite laminar structure comprising a mat of sound-absorbing material having opposing faces thereon of which one is perforated to admit sound waves to the mat and the other is closed to prevent the waves from escaping from the mat, the perforated face having a porous skin thereover which is bonded to the mat and comprised of at least two superposed and laminated woven cloth plies each having serially spaced rows of warp threads and serially spaced rows of weft threads intersecting therein so that a multitude of interstices are formed with each ply, the threads of each ply being covered by a cured thermoset resin which bridges the intersections thereof so as to form a continuous matrix having substantial portions of the interstices remaining open therewithin, and corresponding threads of the two plies defining an angle of less than 90° with respect to one another so that the open portions of mutually adjacent interstices in the plies are out of registry with one another to a preset degree dependent on the porosity desired.

2. The composite laminar structure according to claim 1 wherein the woven cloth plies have a different thread denier and/or thread count per unit dimension, so as to vary the cross-sectional area of the open portions of the interstices from one ply to the next.

3. The composite laminar structure according to claim 1 wherein the woven cloth plies have a relative angular orientation of about 10–45°.

4. The composite laminar structure according to claim 1 wherein the woven cloth plies have a square weave.

5. The composite laminar structure according to claim 1 wherein the woven cloth plies are woven from glass fibers.

6. The composite laminar structure according to claim 1 wherein the woven cloth plies are impregnated with a high temperature polyimide resin system.

7. The composite laminar structure according to claim 1 wherein the sound-absorbing mat has a honeycomb structure to which a solid backing is applied on the other face thereof.

8. The composite laminar structure according to claim 1 wherein the sound-absorbing mat has a honeycomb structure comprised of two or more laminated plies of polyimide resin impregnated woven glass cloth material, to which a solid backing is applied on the other face thereof, also comprised of two or more laminated plies of polyimide resin impregnated woven glass cloth material, and wherein the woven cloth plies of the porous skin are woven in a square weave from glass fibers, and impregnated with a polyimide resin system, and the porous skin is bonded to the mat by a polyimide resin adhesive.

9. A method of laminating a composite laminar structure which is adapted for use with fast moving gas streams, as a mean of attenuating the noise generated thereby, comprising the steps of placing a laminar assembly of two or more plies of resin impregnated woven cloth material in a laminate press, each of said plies being unsaturated with resin so that substantial portions of the interstices remain open therewithin, adjusting the relative angular orientation of the plies so that the open portions of mutually adjacent interstices in the plies are out of registry with one another to a preset degree, laminating the plies with one another to form a skin, while maintaining the open portions of the interstices therein, and then bonding the skin to the perforated face of a mat of sound-absorbing material to form the composite.

10. The method according to claim 9 wherein the woven cloth plies have a different thread denier and/or thread count per unit dimension, so as to vary the cross-sectional area of the open portions of the interstices from one ply to the next.

11. The method according to claim 9 wherein the resin count in the laminar assembly is adjusted when the plies are laminated to one another, to vary the porosity of the skin.

12. In the manufacture of a composite laminar structure for use with fast moving gas streams, as a means of attenuating the noise generated thereby, the steps of placing a laminar asembly of two or more plies of resin impregnated woven cloth material in a laminate press, each of said plies being unsaturated with resin so that substantial portions of the interstices remain open therewithin, and laminating the plies with one another, while maintaining the open portions of the interstices therein, to form a skin for the structure, the relative angular orientation of the plies being adjusted to vary the porosity and therefore the Rayl of the skin, depending on the expected speed of the gas stream and thus the expected frequency of the sound waves emanating therefrom.

References Cited

UNITED STATES PATENTS

| | | |
|---|---|---|
| 3,011,584 | 12/1961 | Lemmerman et al. |
| 3,077,947 | 2/1963 | Peebles et al. |
| 3,103,987 | 9/1963 | Gildard et al. |
| 3,147,820 | 9/1964 | Finger. |
| 3,149,693 | 9/1964 | Keller et al. |
| 3,166,149 | 1/1965 | Hulse et al. |
| 3,231,042 | 1/1966 | Chapman. |

ROBERT S. WARD, Jr., Primary Examiner

U.S. Cl. X.R.

181—42

PO-1050
(5/69)

UNITED STATES PATENT OFFICE
CERTIFICATE OF CORRECTION

Patent No. 3,502,171          Dated March 24, 1970

Inventor(s) Robert T. Cowan

It is certified that error appears in the above-identified patent and that said Letters Patent are hereby corrected as shown below:

Claim 9, line 1, "laminating" should be --fabricating--, line 3, "mean" should be --means--

Claim 12, line 4, "asembly" should be --assembly--

SIGNED AND
SEALED
JUL 14 1970

(SEAL)
Attest:

Edward M. Fletcher, Jr.
Attesting Officer

WILLIAM E. SCHUYLER, JR.
Commissioner of Patents